Figure 3:
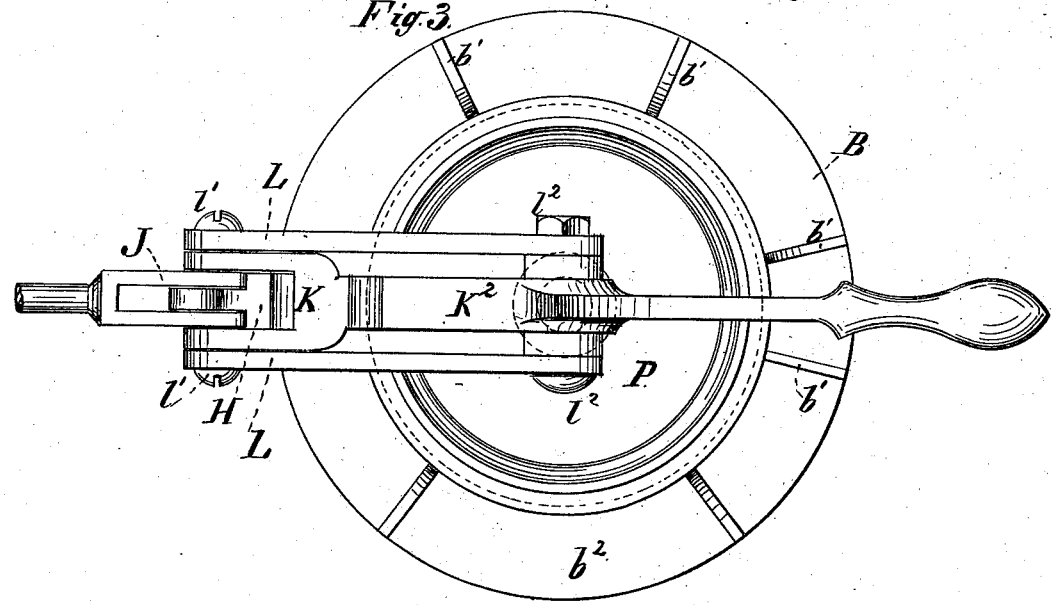

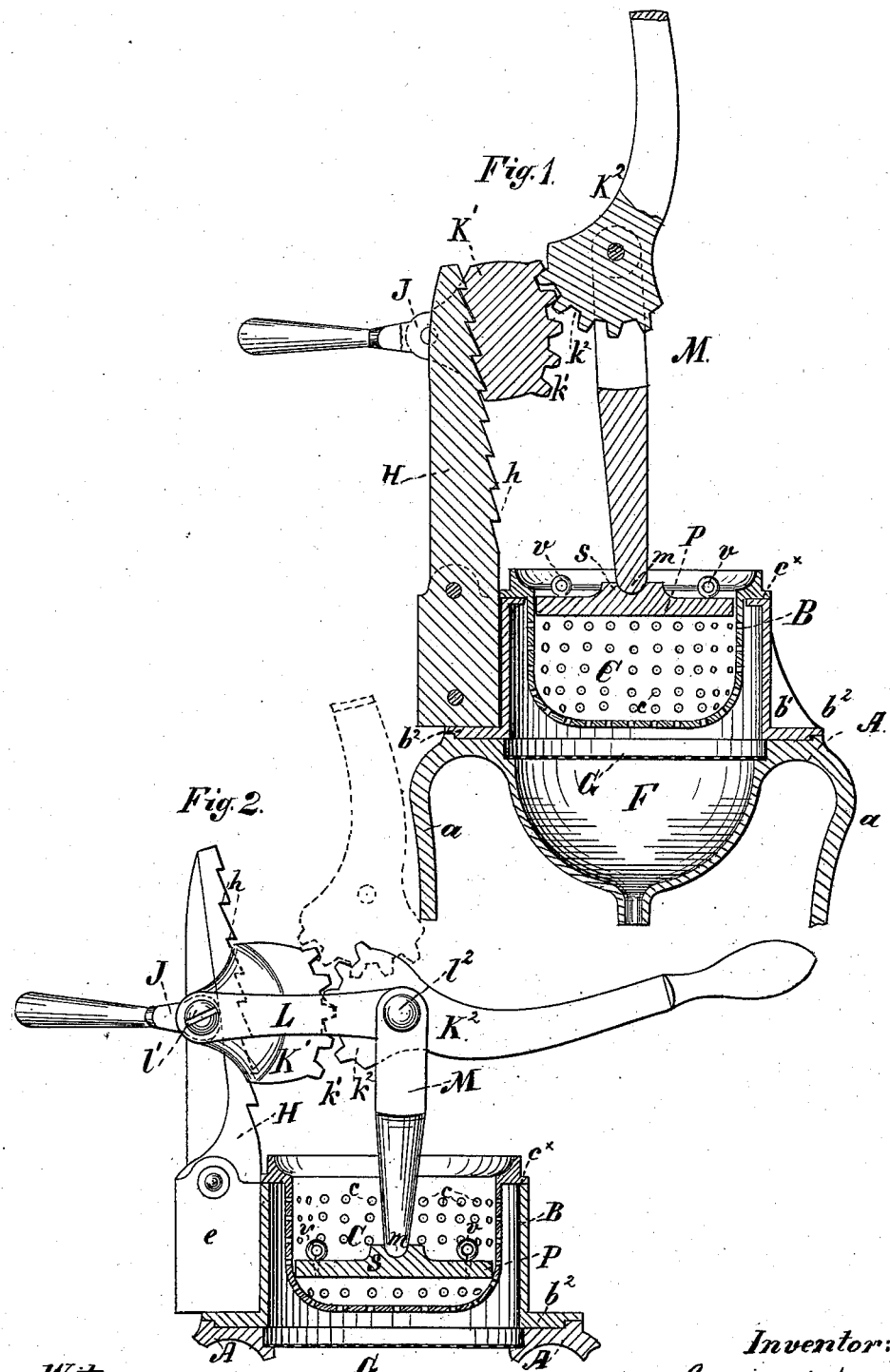

2 Sheets—Sheet 2.

G. A. NEWSAM.
FRUIT-PRESSES.

No. 194,457. Patented Aug. 21, 1877.

Witnesses:
Henry Eichling
A. Koehler

Inventor:
George A. Newsam,
Per E. R. Brown,
Attorney.

UNITED STATES PATENT OFFICE.

GEORGE A. NEWSAM, OF BROOKLYN, NEW YORK.

IMPROVEMENT IN FRUIT-PRESSES.

Specification forming part of Letters Patent No. 194,457, dated August 21, 1877; application filed July 21, 1877.

*To all whom it may concern:*

Be it known that I, GEORGE A. NEWSAM, of Brooklyn, in the county of Kings and State of New York, have invented certain new and useful Improvements in Fruit-Presses; and that the following is a full, clear, and exact description thereof.

My invention, which I call a combined fruit, wine, and cider press, relates to certain improvements in fruit-presses, similar to the press for which Letters Patent No. 161,816 were granted to me under date of April 6, 1875, and it is applicable to the various purposes for which a fruit, wine, or cider press may be employed.

The present invention consists in a novel construction of the lever by which the pressure is applied, whereby it may be variously arranged in order to vary the degree of power; also, in a novel construction, arrangement, and combination of devices, whereby the fulcrum of the pressure-lever may be adjusted to different heights, as desired, according to circumstances; and, further, in certain details of construction and arrangement of parts, whereby several advantages are obtained, as hereinafter particularly set forth.

In carrying out my invention I employ a supporting-stand, and a funnel and filter or strainer, which may be similar to those shown in my former patent; but the other features of this invention are different from those shown in said patent.

The base or main frame of the apparatus rests upon a supporting-frame, and carries a bowl provided with either slots or round holes in its bottom and sides. The frame and bowl are made of metal or any other suitable material, and they may be cast in one piece; but I prefer to make them detachable, as they are thereby more easily kept clean.

The main frame carries a standard for the attachment of the pressure-lever. The standard may be in one piece with the frame; but I prefer to make it detachable, as it can then be more easily replaced when broken. The standard is provided with means for adjusting the fulcrum or resting-point of the pressure-lever at different heights, in order to accommodate it to different quantities of fruit or other substance to be pressed.

The pressure-lever may be of any usual or suitable description; but I prefer to use a lever composed of two parts, with their adjacent edges toothed or clogged, so as to form what I call a "rolling fulcrum," the two parts being connected by links. A connecting rod or bar is pivoted at its upper end to the pressure-lever, and its lower end connects with a plunger or follower by a ball-and-socket or similar connection.

The apparatus thus described may be made of any desired size—either small enough to answer the simplest household purposes, or large enough to be used for pressing any desired quantity of fruit, vegetables, meats, or any other substances.

The accompanying drawing represents an apparatus embodying my improvements.

Figure 4:
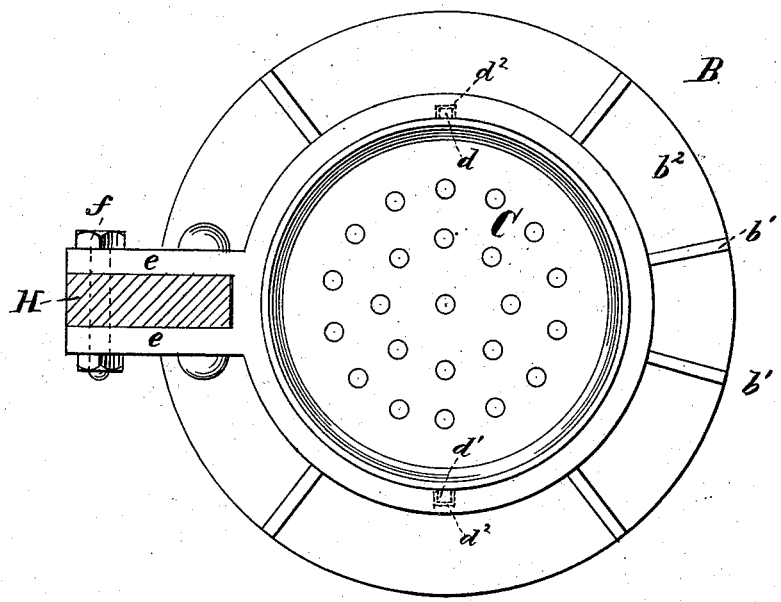

Figure 1 is a vertical section, showing the pressure-lever in one position. Fig. 2 is a vertical section, showing the pressure-lever in another position. Fig. 3 is a top view, with the follower in place in the bowl. Fig. 4 is a top view, partly in section, with the follower removed.

A represents a supporting-stand for the machine proper, provided with legs $a$, and carrying a funnel, F, having a removable perforated cover, G, which serves as a filter or strainer.

The supporting-stand may be made of metal, and the funnel and filter of metal or any other suitable material.

These parts are of substantially the same description as the similar parts shown in my Patent No. 161,816, aforesaid, except that the funnel is not so deep and tapering. The remaining parts of this invention are essentially different from those shown in my patent aforesaid, and I will describe them in detail.

On the top of the supporting-stand A rests the base or main frame of the machine proper. This base consists of a ring or tubular frame, B, the inner surface of which is smooth and cylindrical, or approximately so, and the outer surface is provided with vertical ribs or fins $b^1$, terminating at the bottom in a circular rim or flange, $b^2$. The frame B may thus be made very thin and light, while the ribs $b^1$ and flange $b^2$ render it sufficiently strong, and the flange $b^2$ furnishes a firm and substantial base for supporting the machine on the stand A or other suitable receptacle.

The bowl C is here shown as of uniform thickness throughout, with a flange, $c^x$, at the top, resting on the upper edge of the frame B, and provided with lugs $d^1$ for engagement with notches $d^2$ in the frame, to prevent the bowl from turning in the frame.

When the frame B and bowl C are cast in one piece the flange $c^x$, lugs $d^1$, and notches $d^2$ are dispensed with; but the same space between the bowl and frame should be preserved, in order to allow the juices from the fruit to pass freely through the slots or perforations $c$ in the sides of the bowl, as well as those in the bottom. The bowl is here shown as having a rounded, nearly flat bottom; but said bottom may be either more tapering or perfectly flat, as may be preferred.

The frame B carries a standard, H, to which the pressure-lever is connected. As here shown, the standard is a separate piece from the frame, and fits between two lugs, $e\ e$, cast on the frame, being secured in place by bolts $f$.

Instead of employing the lugs and bolts, the frame B may be provided with a socket of adz-eye form, and the lower end of the standard may be shaped to correspond therewith, and placed in position from below, after the manner of attaching a handle to an adz. When the frame and standard are cast in one piece, the lugs and bolts and the socket are dispensed with.

The standard H has one edge provided with serrations or ratchet-teeth $h$, for engagement with correspondingly-shaped serrations or depressions on or in the contiguous portion of the pressure-lever, for the purpose of allowing the fulcrum of said lever to be adjusted to different heights. When so adjusted it is held firmly and securely by means of a cam, J, provided with a handle for operating it. The cam is here shown as bifurcated, and between its two branches lies a rib formed on the standard H, for the purpose of strengthening the same. This construction insures the proper engagement and operation of the parts. The pressure-lever is provided with lugs or extensions, passing one on each side of the standard H, and the cam J is pivoted to said lugs or extensions.

The pressure-lever here shown is composed of two parts, $K^1\ K^2$, the contiguous ends of which consist of toothed sectors $k^1\ k^2$. The two parts are connected by links L L, one on each side. The pivots $l^1\ l^2$ of the links L may each be the center of a circle of which the sector forms a portion. The part $K^1$ of the lever is stationary, and the part $K^2$ oscillates. By this construction is obtained what may be called a rolling fulcrum.

The part $K^1$ is represented as connected to the standard H by the adjusting devices above described; but in an apparatus in which it is not desired to adjust the fulcrum of the lever to different heights, the part $K^1$ may be permanently attached to the standard or cast in one piece therewith.

To the parts $K^2$ of the lever is pivoted the upper end of a rod or bar, M, the lower end of which connects with a plunger or follower, P, working in the slotted or perforated bowl C.

By this construction of the lever, and this mode of attaching the rod or bar, a uniform vertical motion of said rod or bar is always insured, and a uniform pressure is communicated to the fruit in the bowl from the lever and connecting-rod through the follower P, as said rod connects with said follower at the center of the latter.

Another advantage resulting from this construction of the lever is the increase of power obtained by changing the positions of the toothed sectors with relation to each other. In some cases the parts may be arranged with the uppermost tooth of the sector $k^2$ engaged with the space between the two uppermost teeth of the sector $k^1$, as shown in Fig. 1; but by arranging the parts with the next lower tooth of sector $k^2$ engaged with the uppermost space in sector $k^1$, as shown in Fig. 2, the fulcrum is changed, the leverage is increased, and greater power is obtained.

The rod M may be connected with the follower P by a ball-and-socket joint, or may be pivoted thereto, so as to lift the follower when the pressure-lever is raised. As here represented, the lower end of the rod M is rounded, as shown at $m$, and works in a socket, $s$, on the follower.

In a large press the follower may be provided with handles $v$ for lifting it out of the bowl.

The apparatus, constructed as above described, may be combined with a funnel and filter and supporting-stand, of any suitable description, for the same purpose as described in my former patent.

What I claim as new, and desire to secure by Letters Patent, is—

1. In an apparatus for pressing fruit and for similar purposes, the combination of a serrated standard, a correspondingly serrated or recessed lever, and a cam, constructed and operating substantially as described, whereby the fulcrum of the lever may be adjusted to different heights, as herein set forth.

2. The rolling-fulcrum lever, consisting of the parts $K^1\ K^2$, provided with the toothed sectors $k^1\ k^2$, and connected by the links L L, in combination with a pressing apparatus, substantially as and for the purpose herein described.

3. The combination of the base or main frame B and the standard H, provided with means for attaching and detaching it, substantially as herein described.

4. The pressing apparatus, constructed as herein described, in combination with a funnel and filter and a supporting-stand, substantially as and for the purpose set forth.

GEORGE A. NEWSAM.

Witnesses:
  E. R. BROWN,
  S. L. ROWLAND.